May 9, 1972    W. R. JOHNS    3,661,968
ORGANIC REDUCTION PROCESS
Filed July 24, 1969                              2 Sheets-Sheet 1

Fig. I

INVENTOR
WILLIAM RICHARD JOHNS

BY
Cushman, Darby & Cushman
ATTORNEYS

United States Patent Office  3,661,968
Patented May 9, 1972

3,661,968
ORGANIC REDUCTION PROCESS
William Richard Johns, Reading, England, assignor to Imperial Chemical Industries Limited, London, England
Filed July 24, 1969, Ser. No. 844,483
Claims priority, application Great Britain, Aug. 1, 1968, 36,782/68
Int. Cl. C07c *121/26*
U.S. Cl. 260—465.8    3 Claims

ABSTRACT OF THE DISCLOSURE

In the hydrodimerisation of $\alpha,\beta$-olefinically unsaturated compounds, especially of acrylonitrile to adiponitrile, by means of alkali metal or alkaline earth metal amalgam in the presence of a polar solvent, separation of the product hydrodimer is effected by distilling or evaporating from the product mixture sufficient of the polar solvent and unreacted $\alpha,\beta$-olefinically unsaturated compound, and, if necessary, adding to the product mixture sufficient water, to cause the product mixture to form two liquid phases, one essentially aqueous and the other essentially organic containing the hydrodimer, and then separating the two phases. A preferred method is to distil with steam.

---

Figure 1:
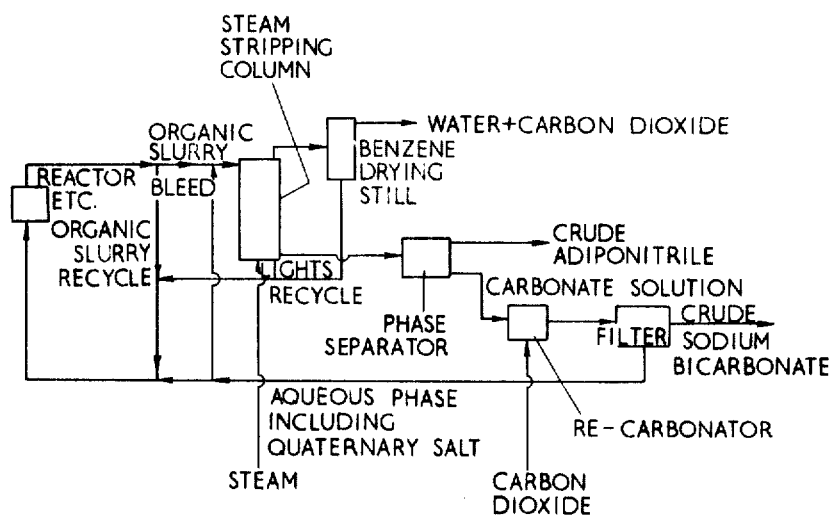

This invention relates to the hydrodimerisation of $\alpha,\beta$-olefinically unsaturated compounds by means of amalgam.

It has already been proposed to convert $\alpha,\beta$-olefinically unsaturated compounds, more particularly $\alpha,\beta$-olefinically unsaturated nitriles and esters, and especially acrylonitrile, to their hydrodimers by reaction with alkali metal or alkaline earth metal amalgam in the presence of a proton source. It has also been proposed to improve the efficiency of the reaction by the use of various additives. Among such additives are various compounds which are polar solvents, and such solvent additives may be used either by themselves or in conjunction with other additives. Thus it has been proposed in British patent specification No. 1,157,441 to hydrodimerise $\alpha,\beta$-olefinically unsaturated nitriles in the presence of an alkyl nitrile such as acetonitrile. It has also been proposed in British patent specification No. 1,157,442 to hydrodimerise $\alpha,\beta$-olefinically unsaturated nitriles, esters or amides in the presence of an organic sulphoxide or sulphone, for example dimethyl sulphoxide. It has further been proposed in British patent specification No 1,157,443 to hydrodimerise $\alpha,\beta$-olefinically unsaturated nitriles or esters in the presence of a polar organic amide, for example dimethyl formamide. It has further been proposed in British patent specification No. 1,063,497 to hydrodimerise $\alpha,\beta$-olefinically unsaturated nitriles or esters in the presence of a salt that provides alkylated cations in the reaction medium and a polar inert solvent, for example dioxan. It has still further been proposed in British patent specification No. 1,157,445 to hydrodimerise $\alpha,\beta$-olefinically unsaturated nitriles or esters in a reaction medium that contains more than 50% by weight of a polar aprotic solvent, for example acetonitrile, and a dissolved non-reacting fully-alkylated onium salt.

In such processes in which a polar solvent is present during the hydrodimerisation reaction, difficulties may arise in the isolation of the product hydrodimer and in the conduct of the process generally, especially where continuous operation is contemplated. In addition to the amalgam and the $\alpha,\beta$-olefinically unsaturated compound it is necessary for there to be present in the reaction system a proton source to react with the alkali or alkaline earth metal of the amalgam to effect reduction. The proton source is frequently water, but other sources are possible, for example alcohols or acids. In addition, for good yields of hydrodimer, it is necessary for the pH to be controlled. Where the proton source is water (or a non-acidic substance such as an alcohol) the reaction of the alkali or alkaline earth metal of the amalgam with the proton source will yield alkali which, unless neutralised, will rapidly raise the pH to a level at which reactions other than the desired hydrodimerization reaction, for example polymerisation, become important. Except where acid is used as the proton source, therefore, it will generally be necessary to add an acid or an acidic buffer to maintain the pH at an acceptable level. The product mixture will, therefore, contain, in addition to the spent amalgam, the product hydrodimer and the polar solvent, and probably also some unchanged $\alpha,\beta$-olefinically unsaturated compound, unchanged proton source, and the neutralisation product of the alkali or alkaline earth metal of the amalgam and the acid or acidic buffer, and possibly in addition by products of the reaction. The product hydrodimer has to be separated from the other constituents of the product mixture. Moreover, in any continuous process in which acid or an acidic buffer is used for neutralising any excess alkali generated, and in which the unreacted $\alpha,\beta$-olefinically unsaturated compound, the polar solvent and possibly other additives are recycled, it will also be necessary to separate from the product mixture the neutralisation product of the alkali or alkaline earth metal of the amalgam and the acid or acidic buffer, which may conveniently be referred to in short as the metal salt.

Separation of the spent amalgam from the other constituents of the product mixture presents no difficulty since it readily forms a separate liquid phase. The other constituents of the product mixture will normally form a single liquid phase in which, however, the metal salt, if present, may be suspended. At this stage it is convenient to consider the specific instance in which acrylonitrile is hydrodimerised by means of sodium amalgam in the presence of water as proton source and acetonitrile as polar solvent, the pH being controlled during the reaction by the addition of carbon dioxide as the acidic buffer. In this case the product mixture contains the hydrodimer adiponitrile, unchanged acrylonitrile, acetonitrile, water, sodium bicarbonate and spent amalgam, possibly with reaction by products. After the spent amalgam has been separated the remaining product mixture consists of a single liquid phase (composed of adiponitrile, acrylonitrile, acetonitrile and water) containing solid sodium bicarbonate in suspension. Although separation of the solid sodium bicarbonate from the liquid phase by filtration or centrifuging is possible, the small crystal form of the sodium bicarbonate makes this a slow and inefficient operation. Accordingly, as an alternative, it has already been proposed in French patent specification No. 1,555,206 in the case of a continuous process, to treat the product mixture remaining after separation of the spent amalgam with either water or a non-polar organic solvent (for example xylene or toluene), or with both, so that the remaining product mixture separates into two liquid phases, one an essentially organic phase containing the hydrodimer, and the other an aqueous phase containing the metal salt. In the specific instance discussed above, the organic phase will contain adiponitrile, acrylonitrile, and, of course, any non-polar organic solvent, and the aqueous phase will contain sodium bicarbonate.

We have now found a further alternative method of working up the product mixture. According to this method, using the above-mentioned specific instance for illustration, the low boiling organic material, mainly acrylonitrile and acetonitrile, is first removed from the product mixture (from which the spent amalgam has already been separated) by distillation or evaporation. In the absence of the low boiling constituents the product hydrodimer, adiponitrile, is only sparingly soluble in the water present, so that separation of the residue into two liquid phases will occur, one organic consisting essentially of adiponitrile and the other aqueous to which the metal salt will migrate. Separation of the two phases is then a simple matter. In some instances in which insufficient water is present, or in which no water is present due to the use of a proton source other than water, it may be necessary to add water to achieve an adequate phase separation. The metal salt in the product mixture, in the particular case chosen for illustration, is sodium bicarbonate. During the distillation or evaporation step this is wholly or partly decarbonated so that the metal salt is then present, wholly or partly as sodium carbonate or sodium sesquicarbonate, and may be completely soluble in the aqueous phase.

Accordingly, our invention provides a process for the hydrodimerisation of $\alpha,\beta$-olefinically unsaturated compounds by means of alkali metal or alkaline earth metal amalgam in the presence of a polar solvent in which separation of the product hydrodimer is effected by removing from the product mixture, by distillation or evaporation, sufficient of the polar solvent and unreacted $\alpha,\beta$-olefinically unsaturated compound, and, if necessary adding to the product mixture sufficient water, to cause the product mixture to form two liquid phases, one essentially aqueous and the other essentially organic containing the hydrodimer, and then separating the two phases.

The $\alpha,\beta$-olefinically unsaturated compound will obviously be one which is susceptible to hydrodimerisation by means of amalgam. Such compounds are those that are acceptors in Michael reactions ("Michael acceptors"), that is they contain a group of the formula

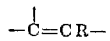

in which R is a group which activates the double bond. Examples of such compounds are listed in "Organic Name Reactions" by Krauch and Kunz, 1964, John Wiley & Sons, at page 315, in "Name Reactions in Organic Chemistry" by A. R. Surrey, 2d edition, 1961, Academic Press, at pages 173 to 174, and in "Name Index of Organic Reactions" by J. E. Gowan and T. S. Wheeler, 1960, Longmans, at pages 169 to 172. Particularly important are $\alpha,\beta$-olefinically unsaturated nitriles and esters, especially acrylonitrile and alkyl substituted acrylonitriles such as methacrylonitrile and crotonitrile, and esters of acrylic acid, more especially the lower alkyl esters, for example methyl and ethyl acrylate.

Alkali metal amalgams are generally preferred and, because of commercial availability, that normally used will be sodium or potassium amalgam.

The polar solvent may be any such solvent which it is advantageous to use in the amalgam hydrodimerisation of $\alpha,\beta$-olefinically unsaturated compounds, provided that it can be separated from the product hydrodimer during the distillation or evaporation step of our process. The separation will be possible if the polar solvent is sufficiently differentiated in boiling point from the product hydrodimer, or forms, with one or more of the other constituents of the product mixture or with a further component added for the purpose, an azeotrope that is sufficiently differentiated in boiling point from the product hydrodimer to permit separation by distillation. Suitable polar solvents are mentioned in the previous applications and specifications discussed hereinbefore. Particularly suitable are, for example, acetonitrile, dioxan, formamide, dimethyl formamide, dimethyl acetamide, dimethyl sulphoxide and tetrahydrofuran.

The process of our invention is particularly applicable to the separation of the product hydrodimer in the process of British patent specification No. 1,157,445 in which an $\alpha,\beta$-olefinically unsaturated ester or nitrile is hydrodimerised by an amalgam reduction system, the ester or nitrile being contained in a homogeneous reaction medium including a proton source that co-operates with the amalgam to provide said reduction system, and which is characterised in that the reaction medium contains more than 50% by weight of a polar aprotic solvent and a dissolved non-reacting fully-alkylated onium salt to enhance yields of dimer. In this embodiment of our process the fully-alkylated onium salt is preferably a quaternary ammonium salt having radicals of aliphatic character attached to the nitrogen atom. Such salts are described, for example, in British patent specification No. 1,063,497. Tetra-alkyl ammonium salts are especially suitable, more especially those having three or four lower alkyl radicals (of $C_1$ to $C_4$ alkyl) attached to the nitrogen atom, for example tetrabutyl ammonium, cetyl-trimethyl ammonium, tetraethyl ammonium and methyltriethyl ammonium salts, with the last two being particularly favoured. The anion associated with the cation in the salt is not critical, and may, for example, be a halide, for example chloride or bromide, or sulphonate, for example p-toluene sulphonate, anion.

In this embodiment of our process it is preferred that the reaction medium has an apparent pH of from 7 to 11.5, and contains a proportion of $\alpha,\beta$-olefinically unsaturated ester or nitrile within the range of from 2.5 to 20 mole percent, a proportion of proton source (for example water) within the range of from 1 to 30 mole percent and a proportion of quaternary ammonium salt exceeding 0.2 mole percent and preferably not exceeding 8 mole percent, the remainder consisting essentially of polar solvent. By "apparent pH" is meant the pH as recorded on a conventional pH recording instrument, which pH, in the case of systems which are predominantly organic in character and contain only minor amounts of water, will not necessarily correspond with the actual hydrogen ion concentration. The apparent pH is controlled within the preferred range by the addition of an acid or an acidic buffer and for this purpose carbon dioxide is preferred which maintains the apparent pH within the range of about 8.5 to 9.5. With sodium amalgam, and using carbon dioxide for pH control the metal salt formed will be sodium bicarbonate. In our process this sodium bicarbonate or its decarbonation product migrates to the aqueous phase which is formed when the polar solvent and unchanged $\alpha,\beta$-olefinically unsaturated compound are removed from the product mixture by distillation or evaporation, and is then readily separated from the organic phase formed with it which contains the hydrodimer. The aqueous phase will also contain the quaternary ammonium salt. After reconverting the sodium salt to sodium bicarbonate by recarbonation sodium bicarbonate can be separated from the quaternary ammonium salt for example by filtration, or by recrystallisation followed by filtration, or by leaching. In a continuous process the whole of the aqueous phase, after separating from it the sodium bicarbonate, can be recycled so that any organic compounds present in it, for example product hydrodimer, are not lost.

This embodiment of our invention is particularly suitable for the manufacture of adiponitrile from acrylonitrile.

The hydrodimerisation reaction is normally carried out at temperatures within the range 0° to 55° C. with temperatures within the range 30° to 45° C. being preferred. Owing to the heterogeneous nature of the reaction system good agitation is desirable.

The removal of the polar solvent and unchanged $\alpha,\beta$-olefinically unsaturated compound from the product mixture may be effected by distillation.

Alternatively, and preferably, the distillation or evaporation step of our process may be effected by adding live steam to the product mixture especially in the case where the polar solvent forms a low boiling azeotrope with water.

We have devised a system of operation for the continuous manufacture and separation of the product hydrodimer in which live steam is used in the separation. In this system the product mixture (after separation of the spent amalgam) is fed to the top, or near to the top, of a packed column. Live steam is fed into the bottom of the column with the result that the polar solvent and unchanged $\alpha,\beta$-olefinically unsaturated compound are vapourised and leave the top of the column, with the uncondensed steam, and the remainder of the product mixture, containing the product hydrodimer and condensed steam, leaves the bottom of the column. The water may be removed from the distillate, for example by an extractive distillation using a non-polar solvent such as benzene.

The system of operation is illustrated in the flow sheet of FIG. 1 which relates to the product mixture, containing adiponitrile as the product hydrodimer, obtained by the hydrodimerisation of acrylonitrile with sodium amalgam in the presence of a polar solvent, for example acetonitrile, and a quaternary ammonium salt, using carbon dioxide for pH control and water as the proton source. In this system a part of the product mixture (after separation of the spent amalgam) is recycled and the remainder, the organic slurry bleed, consisting of a mixture of adiponitrile, unchanged acrylonitrile, polar solvent, water, quaternary salt and sodium bicarbonate (the last being largely in suspension) is fed to the top, or near to the top, of a column into the bottom of which live steam is fed. A distillate consisting of a mixture of water, acrylonitrile and polar solvent leaves the top of a column as a vapour and passes to a drying still, containing benzene, in which the water is removed, and the dried "lights" fraction is then recycled to the reactor. Carbon dioxide formed by de-carbonation of the sodium bicarbonate also leaves the top of the column. A mixture consisting of water, adiponitrile, quaternary ammonium salt and sodium carbonate leaves the bottom of the column and passes to a separating vessel where it separates into two phases, an organic phase consisting of crude adiponitrile, and an aqueous phase containing the quaternary ammonium salt and sodium carbonate in solution. The solution is treated with carbon dioxide to convert sodium carbonate to sodium bicarbonate which is precipitated in a suitable crystalline form and filtered off. After separating the sodium bicarbonate the aqueous solution of quaternary salt is recycled to the reactor.

The system of operation described, using live steam for the distillation step, is of particular benefit where the polar solvent is one which forms an azetrope with water, for example acetonitrile, propionitrile, dioxan or tetrahydrofuran. It would be of particular interest if the polar solvent were propionitrile for in this case the azeotrope obtained would split into two phases, one predominantly propionitrile and the other water. There would then be no necessity to remove water from the propionitrile by an extractive distillation with benzene for example.

In the process as operated in FIG. 1, the water phase from the drying still may be used to raise steam for the stripping column. In this way it is possible to reduce the loss of benzene, acetonitrile etc. from the system without disturbing the water balance. The crude adiponitrile may be washed with water, or preferably with an aqueous solution of greater density than adiponitrile, to remove the residual quaternary salt.

The item labelled reactor includes the acrylonitrile, amalgam and carbon dioxide feed streams, the spent amalgam stream and the equipment to handle these. If the concentration of the quaternary salt in the aqueous phase from the phase separator is too low part of the water from this recycle stream may be evaporated and the resulting steam used to provide part of the steam required for the stripping column.

An advantage of the method described for the separation of the sodium salt is that by decarbonation of the sodium bicarbonate and subsequent recarbonation under controlled conditions it is possible to crystallise the sodium bicarbonate in a purer and more readily filtered form, and so assist the separation of the sodium salt from the quaternary ammonium salt. However, although this method of separation is preferred it is possible to filter the sodium bicarbonate from the organic reaction medium prior to the distillation step.

In order to verify the operation of the separation scheme a mixture simulating the reaction mixture has been steam-distilled.

Figure 2:
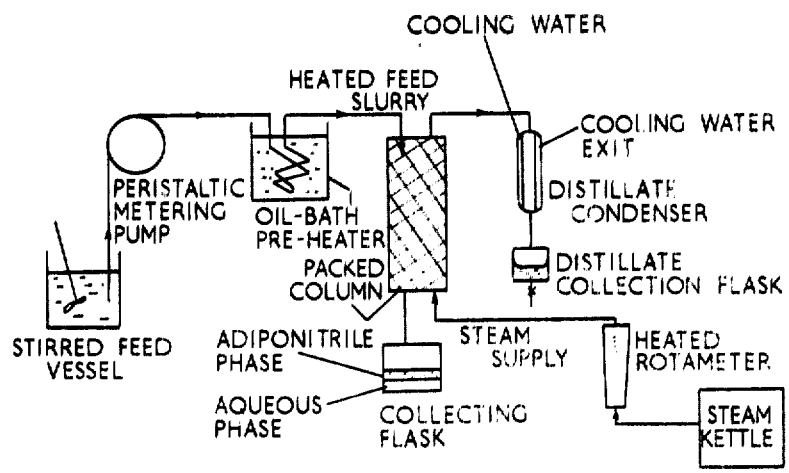

The apparatus is shown schematically in FIG. 2. The essential part is a 60 cm. high x 2.5 cm. diameter glass column packed with ¼" diameter class cuts and maintained approximately adiabatic by using an electrical back-off heater. The simulated reaction mixture is pumped by a peristaltic metering pump from a well stirred feed vessel through a pre-heating oil bath to the top of the column, where it is just below its bubble point. The column is operated at essentially atmospheric pressure. The steam is fed from an electrically heated steam kettle through a rotameter to the bottom of the distillation column. This rotameter is also electrically heated ($\approx 105°$ C.) to avoid steam condensation and is used to check that the steam supply is being generated at the correct, uniform, rate. The vapour from the column is condensed in a double-surface glass water-cooled condenser and collected in a distillate receiver. The stripped solution is collected in a spherical flask at the bottom of the packed column.

It was necessary to dilute the feed until it was approximately 50% water to ensure that a sufficient quantity of sufficiently mobile liquid passed down the column to convey the sodium bicarbonate through the packing. As close control of the steam feed rate was difficult slightly more than the theoretical steam requirement was fed to the column.

In the analyses of the product phases the organic compounds were usually measured by gas-liquid-chromatography, sodium carbonate and bicarbonate by titration and the quaternary ammonium salt by chloride ion analysis. Water content was usually determined by difference.

The apparatus was run for 12.67 minutes at an average feed rate of 35 g./min. of nitrile mixture and 5.7 g./min. of steam. The slurry feed temperature to the column was approximately 72° C. and the temperature of the mixture within the top of the column varied in the range 76 to 82° C. The analyses of the phases and the overall mass balances are summarized in Table 1. Note that for mass balance purposes sodium carbonate is expressed as the equivalent mass of sodium bicarbonate, in this way it is not necessary to make allowance for the 6.4 g. of carbon-dioxide that are evolved in the conversion of 26.4 g. of sodium bicarbonate to 16.7 g. of sodium carbonate. As the hold-up in the column was obtained by difference, it is immaterial, for mass balance purposes, whether the sodium salt remaining was sodium carbonate monohydrate or sodium bicarbonate.

Some difficulty was experienced in analysing for acetonitrile in the presence of water so that the composition of the feed mixture remaining was assumed to be the same as the original mixture. The difficulty in acetonitrile analysis probably resulted in a slight overestimation of the quantity present which would account for the 10% discrepancy in the acetonitrile mass balance. Since, in most instances, the water concentration is estimated by mass balance, an overestimate of the acetonitrile concentration would result in an underestimate of the water concentration. Hence, the samll (10%) error in the estimate of acetonitrile concentrations could account for the similarly small (3%) discrepancy in the overall water balance.

The accuracy of the overall heat balance confirms that nearly adiabatic operation was obtained.

TABLE 1.—OVERALL MASS BALANCE FOR EXPERIMENT [a]

| Phase component | Feeds | | | | Products | | | | | |
|---|---|---|---|---|---|---|---|---|---|---|
| | Feed mixture | Water in feed pipe [b] | Steam fed | Total | Feed mixture remaining [c] | Hold-up in packed column [d] | Distillate | Adiponitrile phase | Aqueous phase [e] | Total |
| Acetonitrile | 121 | | | 121 | 19.3 | | 91.6 | 1.43 | 20.8 | 133 |
| Acrylonitrile | 4.8 | | | 4.8 | 0.76 | | 3.88 | .02 | | 4.7 |
| Adiponitrile | 51.7 | | | 51.7 | 8.2 | 11.6 | 0.1 | 18.8 | 13.0 | 51.7 |
| Water | 275.7 | 53.3 | 71.9 | 401 | 43.8 | | 35.2 | 3.5 | 307 | 390 |
| Tetra-ethyl ammonium chloride | 14.3 | | | 14.3 | 2.28 | | | .02 | 12.0 | 14.3 |
| Sodium bicarbonate | 60.0 | | | 60.0 | 9.55 | 24.0 | | | 26.4 | 60.0 |
| Total | 527.5 | 53.3 | 71.9 | 653 | 83.9 | 35.6 | 130.8 | 23.77 | 379.2 | 654 |
| Enthalphy in vapour phase | | | 38,750 | 38,750 | | | [f] 37,250 | | | 37,250 |

[a] Mass quantities in grammes. Heat quantities in calories.
[b] To prime peristaltic pump feed pipe was full at the start of the experiment.
[c] Quantities obtained by proportion from original feed mixture.
[d] Quantities obtained by overall mass balance.
[e] Tetra ethyl ammonium chloride from overall mass balance. Actual analysis was 0.0 g.-sodium bicarbonate, 16.7 g. sodium carbonate, 310 g. water. The sodium carbonate has been expressed as sodium carbonate and the appropriate adjustment has been made in the water reading.
[f] Enthalphy of phase before condensation.
[g] List of components does not include adiponitrile, quaternary ammonium salt or sodium bicarbonate because overall mass balance is used to estimate individual quantities.

NOTE.—Balances, Component,[g] (Ratio out/in): Acetonitrile (1.10); Acrylonitrile (0.96); Water (0.97); Total mass (1.00); Total heat (0.96).

Although we have described live steam for assisting the separation of the polar solvent and the unchanged α,β-olefinically unsaturated compound, the use of other substances for this purpose is possible, for example 1,2-dichloroethane, toluene or methanol.

We claim:

1. In a process for the continuous manufacture of adiponitrile by the hydrodimerization of acrylonitrile by means of sodium amalgam in a reaction medium containing water as a proton source, a polar solvent and a quaternary ammonium salt, the pH of which is controlled within the range 8.5 to 9.5 by the addition of carbon dioxide, the improvement wherein separation of adiponitrile from the product mixture is achieved by feeding a stream of the product mixture from which the spent amalgam has been separated to the top of a packed column, feeding live steam into the bottom of the column whereby the polar solvent and unchanged acrylonitrile are vaporized and leave the top of the column with the uncondensed steam and whereby the sodium bicarbonate in the product mixture is decarbonated to sodium carbonate, taking the remainder of the product mixture from the bottom of the column and allowing it to disproportionate into an aqueous phase containing sodium carbonate and quaternary ammonium salt and a phase consisting essentially of adiponitrile.

2. The process of claim 1 in which the separated aqueous phase from the bottom of the column is recarbonated by treatment with carbon dioxide and the precipitated sodium bicarbonate separated from the residual aqueous solution containing the quaternary ammonium salt.

3. The process of claim 1 in which the vapour leaving the top of the column passes to a drying still in which water is removed and the water-free fraction, consisting essentially of acrylonitrile and polar solvent, is recycled to the reactor.

References Cited

UNITED STATES PATENTS

| | | | |
|---|---|---|---|
| 3,479,386 | 11/1969 | Gregory | 260—465.8 A |
| 3,489,789 | 1/1970 | Dewar et al. | 260—465.8 A |
| 3,542,844 | 11/1970 | Diprose et al. | 260—465.8 A |
| 3,542,845 | 11/1970 | Diprose | 260—465.8 A |
| 3,542,846 | 11/1970 | Bartholomew | 260—465.8 A |
| 3,549,685 | 12/1970 | Badham et al. | 260—465.8 A |
| 3,529,011 | 9/1970 | Badham | 260—465.8 A |

JOSEPH P. BRUST, Primary Examiner

U.S. Cl. X.R.

260—465.1, 485